Patented Feb. 24, 1942

2,274,004

UNITED STATES PATENT OFFICE

2,274,004

TREATMENT OF CORN PROTEIN

Paul R. Shildneck, Decatur, Ill., assignor, by mesne assignments, to Prolamine Products Incorporated, Dover, Del., a corporation of Delaware No Drawing. Application February 16, 1939, Serial No. 256,773

14 Claims. (Cl. 260—112)

The present invention relates to the modification of corn gluten proteins so that they have improved solubility behavior in alkaline solvents.

In the wet-milling method of manufacture of starch from corn, the corn proteins originally insoluble in water together with those rendered water insoluble by the milling process are concentrated to a by-product known as corn gluten. This by-product has potential industrial uses calling for solution of its proteins in the commonly used alkaline protein solvents such as aqueous solutions of the alkali metal hydroxides, of ammonia, and of alkali metal salts of weak acids such as carbonic, sulfurous, boric, and phosphoric. However, the solubility of the proteins of normal corn gluten in these solvents is so slight as to seriously limit the industrial use of corn gluten wherever appreciable solubility of its proteins is required. The maximum concentration of protein obtainable in an extract of corn gluten with aqueous solutions of sodium hydroxide under widely varying conditions of time, temperature, concentration of sodium hydroxide, and ratio of sodium hydroxide to protein is slightly less than three grams of protein per one hundred grams of extract. Moreover, less than one-half of the gluten protein content can be dissolved by means of exhaustive extraction with the alkaline solvent.

An object of the present invention is to so treat normal corn gluten as to materially increase the proportion of the protein content that is soluble in alkaline solvents, and at the same time to increase the solubility of the proteins in those solvents, whereby a larger percentage of the protein may be dissolved and more concentrated solutions be obtained.

A particular object of the invention is to give corn gluten an acid treatment sufficient to produce an improvement in the solubility behavior of the proteins, and provide conditions whereby such products are readily recoverable. The invention also provides for the treatment of corn gluten for the removal of undesirable non-proteinacious material from the protein products.

In addition to increasing said alkali-soluble content and its solubility, the acid treatment in this invention also modifies the starch in the gluten to soluble products, thus permitting a separation of this ingredient from the acid insoluble proteins and fiber by filtration. Referring particularly to corn gluten from the wet-milling process for the manufacture of corn starch, the gluten may contains from 25% to 45% starch on a dry substance basis, depending upon the mill practice. The removal of this starch is desirable because its presence in any large proportion would interfere with many industrial applications of the modified gluten. The undesirable features of starch in this connection are its ease of pasting in alkaline solvents with the formation of extremely viscous solutions, and the sensitivity to water that it imparts to the finished product.

After the acid treatment of the gluten, there remains a slurry of acid-insoluble proteins and fiber in a solution of hydrolyzed starch products. I have found that neutralization of the slurry with caustic soda or soda ash to a pH of 4 to 6 yields a readily filterable mixture from which a good press cake of the proteins and fiber may be obtained. All of the altered starch may be removed from the press cake by washing it with water.

I have also found that a protein product free from fiber may be obtained by extracting the modified proteins from the press cake with an alkaline solvent and then precipitating them by acidifying the extract. In this refining step, it is not necessary to start with the press cake of modified protein and fiber. The slurry after the acid treatment may be made alkaline immediately and filtered. Acidification of the filtrate yields the fiber-free proteins as before. The advantage of the latter procedure is that of fewer steps, and its disadvantage is that of filtering a denser liquor plus that of filtering the mixed hydrolytic products of starch in alkaline solution. Precipitation of the proteins in the fiber-free extracts is best carried out at a pH of 4.5 and in the temperature range of 80° C. to 100° C. These conditions aid in curding or graining the precipitated proteins so that they may be easily filtered and washed. Precipitation at lower temperatures yields a soft gelatinous product that is difficultly filterable, and precipitation at pH values substantially other than 4.5 diminish the yield and quality of product. However, it is contemplated that it may be desirable to depart from the preferred conditions, even if there are some disadvantages.

The acid modified proteins, whether fiber-free or not, are readily soluble to high degree in the mentioned alkaline solvents, forming solutions varying in protein content from ten to more than twenty-five per cent by weight depending upon the nature of the acid treatment, and other factors. Practically all of the gluten proteins are affected by the acid treatment so as to be rendered soluble in the alkaline solvents. Moreover, the solutions of the modified proteins are less sensitive to heat denaturation and to precipitation with neutral salts than those of the untreated proteins. When properly dried at moderate temperatures and pulverized, the product maintains its solubility in the alkaline solvents undiminished.

Strong acidity rather than so-called strong acids are required for the invention. Both strong acidity and weak acidity are effective to solubilize the starch, but such weaker acidities are not effective to modify the protein as desired. Organic as well as inorganic acids may provide the desired high acidity. For example, gluten may be destarched by treating it at a pH of 1.7 for one hour at 100° C., but the alkali soluble content of the protein subjected to this acid treatment is but slightly increased. The invention therefore contemplates not only acid-hydrolysis of the starch, but acid conditions to do it which are far more drastic than necessary so as to modify the protein also.

Preferably, a strong mineral acid such as hydrochloric or sulfuric acid is used in carrying out the invention. The acid treatment of the gluten has many aspects and variations that have marked effects upon the character of the product. The treatment required to produce the desired effect may vary over a wide range of reaction time, reaction temperature, and concentration of acid or pH. As an example of the lower limit of acid concentration, the desired effect may be obtained by adjusting the regular mill run gluten suspension to a pH of 1.5 with hydrochloric acid and heating it at 125° C. for 30 minutes. Pressure may be used. The acid concentration required to produce this pH in the gluten varies from 0.35 to 0.40 volume per cent. The solubilizing effect on the protein of the acid treatment diminishes rapidly with pH values greater than 1.5, and practically vanishes at a pH of 2.0, regardless of time or temperature. As an example of the higher concentrations of acid that may be used, the desired effect is obtained by pasting dry, powdered gluten with concentrated hydrochloric acid (36% HCl by weight) at low temperatures (20-40° C.), allowing the paste to age at the same temperature for 8 to 24 hours, then diluting it with several volumes of cold water. The same effect may be produced by substituting 75% sulfuric acid for the 36% hydrochloric acid. In general for a given reaction mass increase in temperature shortens the time. Therefore pressure may be desired for shorter times.

From the standpoint of economy, the acid treatment is preferably carried out with the strong inexpensive mineral acids at low concentrations and at elevated temperatures. The two chief examples of such acids are hydrochloric and sulfuric acids. Regarding the kind and concentration of acid used, it has been found that the pH of the reaction mixture within the commercially feasible pH range of zero to two is the controlling factor. Other factors being the same, there exists no detectable difference in the solubilizing effect on the corn gluten proteins of different acids at the same pH values. In general, different concentrations of the acids will be required to produce the same pH values because of their differences in equivalent weights and activities. The time and temperature of reaction at a given pH are interdependent; the higher the temperature, the shorter the time required for a certain solubilizing effect and vice versa. With a given temperature of 100° C. and a fixed time of one hour, the effect of decreasing the pH in the range of 1.5 to 0.5 is to rapidly increase the desired solubility factors of the modified proteins in the alkaline solvents. Below a pH of 0.5 and under the specified conditions of time and temperature, the yield of modified proteins diminishes so rapidly that the loss more than offsets any advantage in increased solubility, where yield of product is a factor. Nevertheless, the protein yielded under such conditions inducing loss, is the desired modified protein. The protein loss, expressed as weight percent of the original insoluble gluten protein, amounts to about 7% at a pH of 1.5, about 12% at a pH of 1.0, and about 20% at a pH of 0.5. These losses are undoubtedly due to formation of water soluble products by the acid hydrolysis of the proteins.

The alkaline solutions of the modified proteins in general possess a characteristic greenish brown color the intensity of which, for a given solvent and a given protein concentration, varies with the manner of the acid treatment. With reaction time and temperature held constant, a decrease in pH (i. e., increase in acid concentration) increases the color intensity. Likewise, with a given pH, the color intensity is increased by increasing the reaction temperature, or the reaction time, or both.

The viscosity of the alkaline solutions, for a given solvent and given protein concentration, also varies with the acid treatment, and in such a manner that an increase in color intensity is accompanied by a decrease in viscosity. The factor that affects viscosity the most is pH. At constant reaction time and temperature, a slight reduction in pH causes an appreciable reduction in viscosity.

The greenish brown color of the alkaline solutions limits their industrial uses. Most of the color can be eliminated by a simple modification of the acid treatment, namely, addition of stannous chloride to the reaction mixture at the beginning of the treatment. The proportion of stannous chloride, based on the dry weight of gluten, required to give a product whose alkaline solutions are light yellow in color varies from 0.5% at a pH of 1.5 to about 1.5% at a pH of 0.5.

The following examples will serve to explain the nature of the invention in detail, to demonstrate how it may be carried out, and to give a basis for further explanation.

*Example 1*

A 6000 c. c. volume of gluten suspension at 30° C. containing 220 grams of protein and 110 grams of starch is adjusted to a pH of 0.75 by the addition of 200 c. c. of 36% hydrochloric acid. The acidified mixture is heated on a steam bath with continuous stirring to 96° C. and maintained at 96-98° C. for one hour. Then with rapid and continuous stirring, the hot mixture is neutralized to a pH of 4.5 by the slow addition of 10% caustic soda solution. About 950 c. c. of the caustic solution is required. The hot mixture is filtered and the filter cake is washed on the filter with water. The cake is crumbled and dried in thin layers at a temperature preferably not exceeding 140° F.

*Example 2*

The quantities and conditions of Example 1 are duplicated with the exception that 4.0 grams of hydrated stannous chloride ($SnCl_2.4H_2O$) is dissolved in the 200 c. c. of 36% hydrochloric acid that is added to the gluten suspension.

Example 3

A 6000 cc. volume of gluten suspension at 30° C. containing 220 grams of protein and 110 grams of starch is adjusted to a pH of 0.75 by the addition of 200 cc. of 36% hydrochloric acid. The acidified mixture is heated on a steam bath with continuous stirring to 96° C. and maintained at 96–98° C. for one and one-half hours. The hydrochloric acid is then neutralized by the slow addition of 950 cc. of 10% caustic soda solution. The neutralized mixture is made distinctly alkaline to litmus by the addition of 40 cc. of 28% ammonia water, thereby dissolving the modified proteins. The hot alkaline suspension of fiber in a solution of proteins and hydrolyzed starch is filtered. The clear, light brown filtrate including the press cake washings is heated to 80° to 100° C. and carefully adjusted to a pH of 4.5 by the slow addition of 5% hydrochloric acid. The granular precipitate of proteins is filtered, washed with water adjusted to show a pH of 4.5, and dried at a temperature preferably not exceeding 140° F. The weight of dry product amounts to 200 grams or 83% of the original gluten protein content.

The solubility data in the following Table 1 quantitatively illustrate the essence of the invention. All the determinations were made with dry glutens milled to pass a 100 mesh screen. The mixtures, carefully freed of lumps, were stirred mechanically one hour for the 25° C. determinations, and 15 minutes for the 50° C. ones. Analyses for protein were performed on the supernatant liquors obtained by a standard procedure of centrifuging. The values for mill run gluten with caustic soda at the higher temperature are only approximate because of the centrifuging difficulty brought about by the pasting of the starch.

Table 1

| Solvent | Percent of total protein of a 2 gram sample dissolved in 100 grams of solvent | | | |
|---|---|---|---|---|
| | Mill-run gluten | Product example #1 | Product example #2 | Product example #3 |
| 0.2% NaOH at 25° C | 38 | 94 | 95 | 99 |
| 0.2% NaOH at 50° C | 49 | 96 | 95 | 100 |
| 1.0% NH$_3$ at 25° C | 25 | 92 | 92 | 97 |
| 1.0% NH$_3$ at 50° C | 33 | 93 | 94 | 98 |
| 3.0% Na$_2$CO$_3$ at 25° C | 17 | 85 | 86 | 94 |
| 3.0% Na$_2$CO$_3$ at 50° C | 23 | 88 | 87 | 95 |
| 3.0% Na$_2$SO$_3$ at 25° C | 15 | 83 | 84 | 91 |
| 3.0% Na$_2$SO$_3$ at 50° C | 22 | 85 | 84 | 92 |
| 3.0% Na$_2$B$_4$O$_7$.10H$_2$O at 25° C | 17 | 85 | 84 | 92 |
| 3.0% Na$_2$B$_4$O$_7$.10H$_2$O at 50° C | 24 | 86 | 86 | 92 |
| 3.0% Na$_3$PO$_4$ at 25° C | 13 | 78 | 77 | 85 |
| 3.0% Na$_3$PO$_4$ at 50° C | 21 | 82 | 83 | 86 |

The above table clearly shows that protein is much more soluble in a wide range of alkaline solvents, after the acid treatment. It is also observed that after treatment the protein has more uniform solubility behavior for the various solvents than the protein in the mill-run gluten.

In arriving at Table 2, 1 part of the protein was extracted with 5 parts of the alkaline solvent, giving protein solutions of the strength set forth. It is to be observed the permissible concentration is greatly increased by the acid treatment, and that for the various solvents there is greater uniformity for the treated protein than for the mill run gluten.

Table 2

| Solvent | Weight concentration of protein in extract of 1 part of product with 5 parts of solvent | | | |
|---|---|---|---|---|
| | Mill-run gluten | Product example #1 | Product example #2 | Product example #3 |
| 2% NaOH at 25° C | 2.3 | 13 | 13 | 14 |
| 2% NaOH at 50° C | 2.9 | 14 | 14 | 15 |
| 3% NH$_3$ at 25° C | 1.2 | 12 | 12 | 13 |
| 3% NH$_3$ at 50° C | 1.5 | 13 | 13 | 14 |
| 6% Na$_2$CO$_3$ at 25° C | 0.8 | 11 | 11 | 12 |
| 6% Na$_2$CO$_3$ at 50° C | 1.0 | 12 | 12 | 13 |
| 6% Na$_2$SO$_3$ at 25° C | 0.7 | 10 | 10 | 11 |
| 6% Na$_2$SO$_3$ at 50° C | 0.9 | 11 | 12 | 12 |
| 6% Na$_2$B$_4$O$_7$.10H$_2$O at 25° C | 0.8 | 11 | 11 | 12 |
| 6% Na$_2$B$_4$O$_7$.10H$_2$O at 50° C | 1.1 | 12 | 12 | 13 |

Filtration of the modified proteins is fairly satisfactory in the pH range of 4 to 5, but has been uniformly found to be most satisfactory at a pH of 4.5. At pH values exceeding 6, gelation of the proteins begins and filtration rates grow much slower. The filtration rates do not diminish very much at pH values below 4, but the product dries to a dark colored, horny mass, dries slowly, and has inferior solubility. The limits are therefore set from pH 4 to pH 6.

The beneficial action of stannous chloride on the color of the alkaline solutions of the modified proteins applies to all the modifications of the acid treatment.

From a practical standpoint, and with regard to concentration of acid, all the useful modifications of the acid treatment are included in the pH range of zero to two. The time and temperature of treatment will vary, depending in part upon the modification desired. These two factors should not be limited to one hour and 100° C. respectively, as used as a standard to illustrate the invention by comparative effects.

Solutions of the modified proteins in caustic soda more concentrated than those listed in Table 2 may be obtained easily. One part of the product from Example 3 readily dissolves in three parts of 5% caustic soda solution, forming a 25% protein solution.

In conclusion it should be observed that three distinct sequences are described after the acid hydrolysis to provide alkaline protein solution free from fiber.

1. Alkalize, and filter,
2. Filter, alkalize, and filter,
3. Filter, extract with alkali.

The resulting alkaline solutions may be used as such, or treated to recover the protein from it as a wet cake, which may be dried and ground.

It is further to be understood that the essence of the invention is the acid treatment of the protein whether or not starch is present. The most common source of the protein for treatment is one having a starch content, which is easily eliminated by the process without special effort to eliminate it. It is also contemplated that starch may be removed prior to the acid treatment, and that starch-free protein be used for the acid treatment. Thus, a gluten containing starch may be treated by a mild acid treatment which merely hydrolyzes the starch without modifying the protein in accordance with the present invention. Furthermore, a gluten containing starch may be treated to the action of diastase to solubilize the starch without modifying the proteins to have improved solubility behavior with alkaline solvents.

Accordingly in wording the appended claims where it is indicated that the process is capable of solubilizing all the starch content of the gluten, the content may vary from 0 to some appreciable figure, and it is not intended to limit the claim to a gluten having a starch content.

I claim:

1. The method of treating corn gluten having not over 45 parts of starch to about 55 parts of protein which comprises subjecting the gluten to the action of acid in an aqueous mass of pH from 0 to 2 to solubilize all the starch content of the gluten without dissolving or destroying the protein character of the resulting gluten and to increase the solubility of the protein content in alkaline solutions, separating solid protein from the liquid vehicle containing the solubilized starch, and recovering the protein.

2. The method of treating corn gluten having not over 45 parts of starch to about 55 parts of protein which comprises subjecting the gluten to the action of acid in an aqueous mass of pH from 0 to 2 to solubilize all the starch content of the gluten without dissolving or destroying the protein character of the resulting gluten and to increase the solubility of the protein content in alkaline solutions, adjusting the resulting mass in aqueous suspension to a pH of from 4 to 6 whereby solid protein is rendered readily separable, separating solid protein from the liquid vehicle which carries the solubilized starch, and recovering the protein.

3. The method of treating corn gluten having not over 45 parts of starch to about 55 parts of protein which comprises subjecting the gluten to the action of acid in an aqueous mass of pH from 0 to 2 to solubilize all the starch content of the gluten without dissolving or destroying the protein character of the resulting gluten and to increase the solubility of the protein content in alkaline solutions, adjusting the resulting mass in aqueous suspension to a pH of 4.5 whereby solid protein is rendered readily separable, separating solid protein from the liquid vehicle which carries the solubilized starch, and recovering the protein.

4. The method of treating corn gluten having not over 45 parts of starch to about 55 parts of protein which comprises subjecting the gluten to the action of acid in an aqueous mass of pH from 0 to 2 to solubilize all the starch content of the gluten without dissolving or destroying the protein character of the resulting gluten and to increase the solubility of the protein content in alkaline solutions, separating solid protein from the liquid vehicle containing the solubilized starch, and drying the protein at a temperature not exceeding 140° F.

5. The method of treating corn gluten which comprises subjecting the gluten to the action of acid in an aqueous mass of pH from 0 to 2 to solubilize all the starch content of the gluten without dissolving or destroying the protein character of the resulting gluten and to increase the solubility of the protein content in alkaline solutions, adding alkali to an aqueous acid suspension of the protein to render the mass distinctly alkaline to litmus whereby to dissolve protein, separating liquid vehicle from solid suspension including fiber, adjusting the separated liquid vehicle to a pH of from 4 to 6 whereby protein is rendered insoluble and readily separable, and separating solid protein from liquid vehicle in which the solubilized starch is carried.

6. The method of treating corn gluten which comprises subjecting the gluten to the action of acid in an aqueous mass of pH from 0 to 2 to solubilize all the starch content of the gluten without dissolving or destroying the protein character of the resulting gluten and to increase the solubility of the protein content in alkaline solutions, adjusting the resulting mass in aqueous suspension to a pH of from 4 to 6 whereby protein and fiber are rendered separable from the liquid vehicle carrying solubilized starch, separating the solids and the liquid vehicle, rendering the solids in aqueous suspension distinctly alkaline to litmus whereby to dissolve protein, and separating the alkaline protein solution from the solids and fiber.

7. The method of claim 1 in which a small amount of stannous chloride is present in the acid treatment whereby the color of the resulting modified protein and of alkaline solutions of such protein is lightened, the amount of stannous chloride being approximately 1% of the weight of gluten.

8. The method of claim 1 in which the acid treatment is conducted at a pH of from 0.5 to 1.5 for at least an hour at a temperature not appreciably below that of an open steam bath near 100° C.

9. The method of claim 1 in which the acid treatment is conducted at a pH of from 0.5 to 1.5 for at least an hour at a temperature not appreciably below that of an open steam bath near 100° C., and in which a small amount of stannous chloride is present to improve the color of the resulting protein.

10. The method of claim 1 in which the acid treatment is conducted at a pH of from 0.5 to 1.5 for at least an hour at a temperature not appreciably below that of an open steam bath near 100° C., and in which stannous chloride is present to improve the color of the resulting protein, the amount of stannous chloride varying from 0.5% to 1.5% the weight of the gluten in correspondence to a variation of pH from 1.5 to 0.5.

11. The process of claim 1 in which stannous chloride at about 1% of the weight of the gluten is present in the acid treatment to improve the color of the resulting protein, the amount required being variable and for a given result being increased with increased acidity as indicated by lower pH.

12. The method of treating corn gluten containing starch and protein, which comprises subjecting the gluten to the action of acid in an aqueous mass of pH from 0 to 2 for a sufficient time to solubilize all the starch content of the gluten without dissolving or destroying the protein character of the resulting gluten and to increase the solubility of the protein content in alkaline solutions, alkalizing the resulting mass so that it is distinctly alkaline to litmus whereby to dissolve the modified protein, separating solids including fiber from liquid including protein, adjusting the separated liquid to a pH above 4 and below 7 whereby protein is rendered insoluble and separable, and separating the solids including the protein.

13. The process of claim 12 after which the separated protein is dried at a temperature not exceeding 140° F.

14. The process of claim 12 in which the pH adjustment of the range is made at 4.5 where the protein is most readily separable from the liquid.

PAUL R. SHILDNECK.